Figure 1:
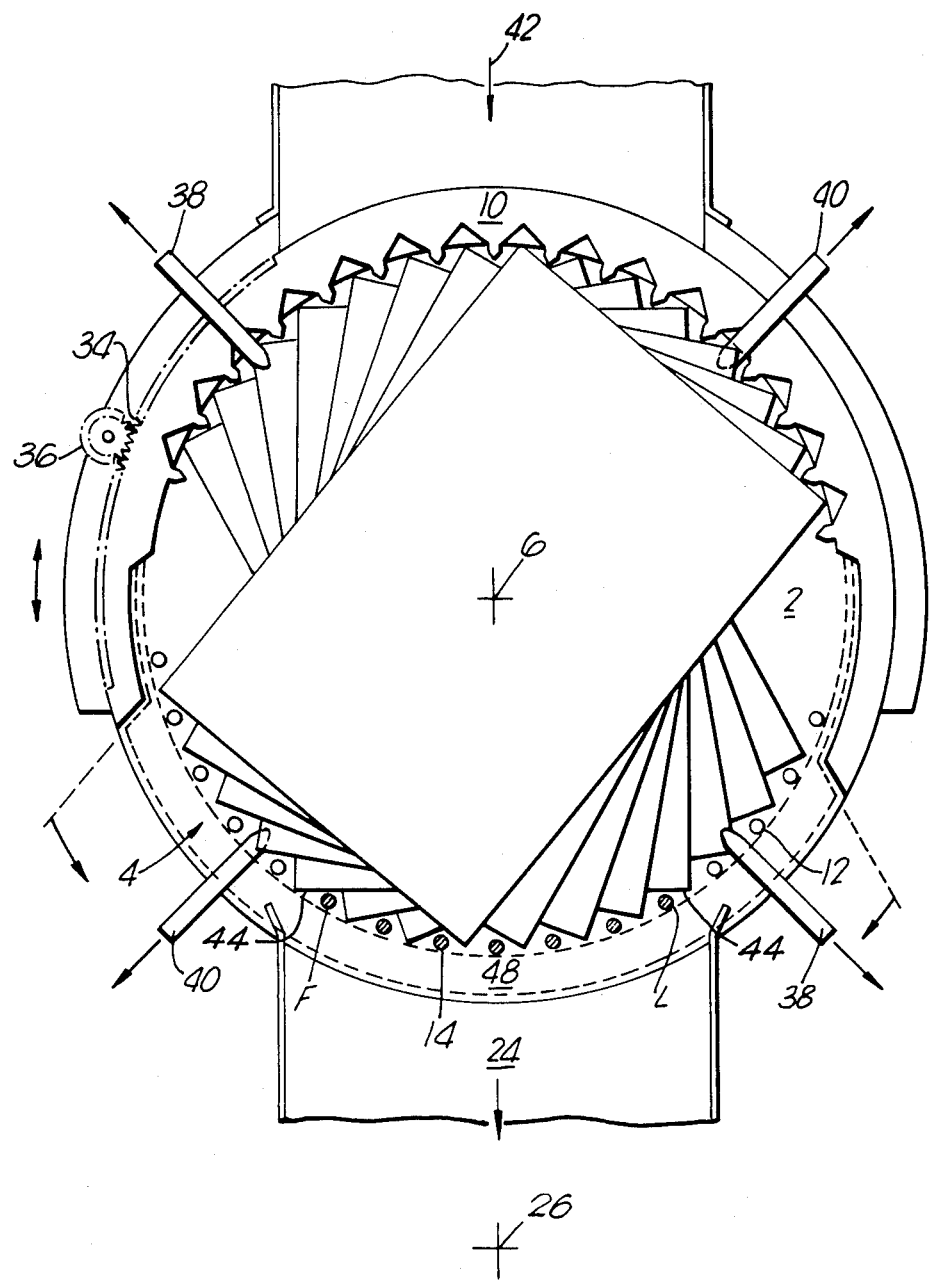

United States Patent [19]

Spence-Bate

[11] Patent Number: 4,714,240
[45] Date of Patent: Dec. 22, 1987

[54] LAMINA RETRIEVAL APPARATUS

[75] Inventor: Harry A. H. Spence-Bate, Morley, Australia

[73] Assignee: Joyce Florence Spence-Bate, Morley, Australia

[21] Appl. No.: 823,765

[22] Filed: Jan. 29, 1986

[30] Foreign Application Priority Data

Jan. 29, 1985 [AU] Australia .................. PG9069

[51] Int. Cl.⁴ .................................. B65H 3/30
[52] U.S. Cl. ........................ 271/3.1; 221/67; 271/18; 271/97; 271/213; 353/25; 353/27 R; 353/DIG. 1
[58] Field of Search .............. 271/109, 10, 314, 81, 271/213, 216, 18, 3.1, 278; 209/644, 900, 643; 270/58; 221/DIG. 1, 211, 278, 210, 224, 225; 414/116, 54

[56] References Cited

U.S. PATENT DOCUMENTS

| 2,928,671 | 3/1960 | Allenbaugh | 270/58 |
| 3,661,256 | 5/1972 | Hain | 209/900 |
| 4,537,391 | 8/1985 | Watkiss et al. | 270/58 |

Primary Examiner—F. J. Bartuska
Attorney, Agent, or Firm—Fidelman & Wolffe

[57] ABSTRACT

A lamina retrieval device for storing microfiche, holograms and other flat, sheet-like materials. A stack of laminae are retained in a cage formed by a plurality of guides, with the guides being so mounted as to retain the laminae in an angularly displaced disposition, with each lamina in a group of laminae being angled with respect to an adjacent lamina. To allow for the removal of a lamina, the guides may be formed as split pins so that part of each pin is movable to form an opening in the cage. The device can include fingers for holding a stack of laminae apart to allow removal of the desired lamina. Removal is accomplished in one embodiment through an airflow.

6 Claims, 2 Drawing Figures

U.S. Patent Dec. 22, 1987 Sheet 2 of 2 4,714,240

LAMINA RETRIEVAL APPARATUS

The present invention relates to apparatus for retrieving a flexible lamina, such as a microfiche from a stack.

The retrieval of a single desired lamina such as a card or microfiche from a stack in, for instance, a data retrieval system where there may be hundreds or even thousands of similar laminae has resulted in a multiplicity of devices for retrieval. These devices generally used notched edges or magnetized edges or combinations of these on the laminae and various retraction means to engage with these edges to then retract the desired lamina from a stack. Due to the limitation in the number of effectively mechanical codings on the laminae groups, the laminae have to be separated into separate coded containers and, in turn, these containers further coded into separate containers. In this way the retrieval systems become excessively complicated both mechanically and electrically and thus unreliable and slow to operate, they are overly bulky due to the need to separate laminae into several stages of different containers. As regards the laminae, they are a nuisance to code since the coding cannot be changed, since one lamina cannot be taken out of one system and put into another system and since the coding is prone to damage. In short, the laminae become slaves to a problem ridden system.

A lamina retrieval device according to the present invention comprises a cage including a plurality of guides, the guides being mounted to the cage so as to retain a stack of laminae in an angularly displaced disposition, each lamina in a group of said laminae being flat on the next lamina and angled from the next lamina, means for holding apart the laminae in the stack on either side of a desired lamina, and means for removing said desired lamina from said stack to a station.

The advantage of the device of the invention is that the angular displacement enables easy accurate and rapid lamina removal. Following from this simple construction the desired lamina can be easily isolated from the rest of the stack and the removal means can be simplified to the extent that in one preferred embodiment the removal means comprises an air flow induced between the desired lamina in the case and the station.

Preferably the case is pivotal relative to the station. In one embodiment this pivotal movement about an axis is used in coordination with movement parallel to the axis to place a desired lamina in the stack in a feed position to the station.

Figure 2:
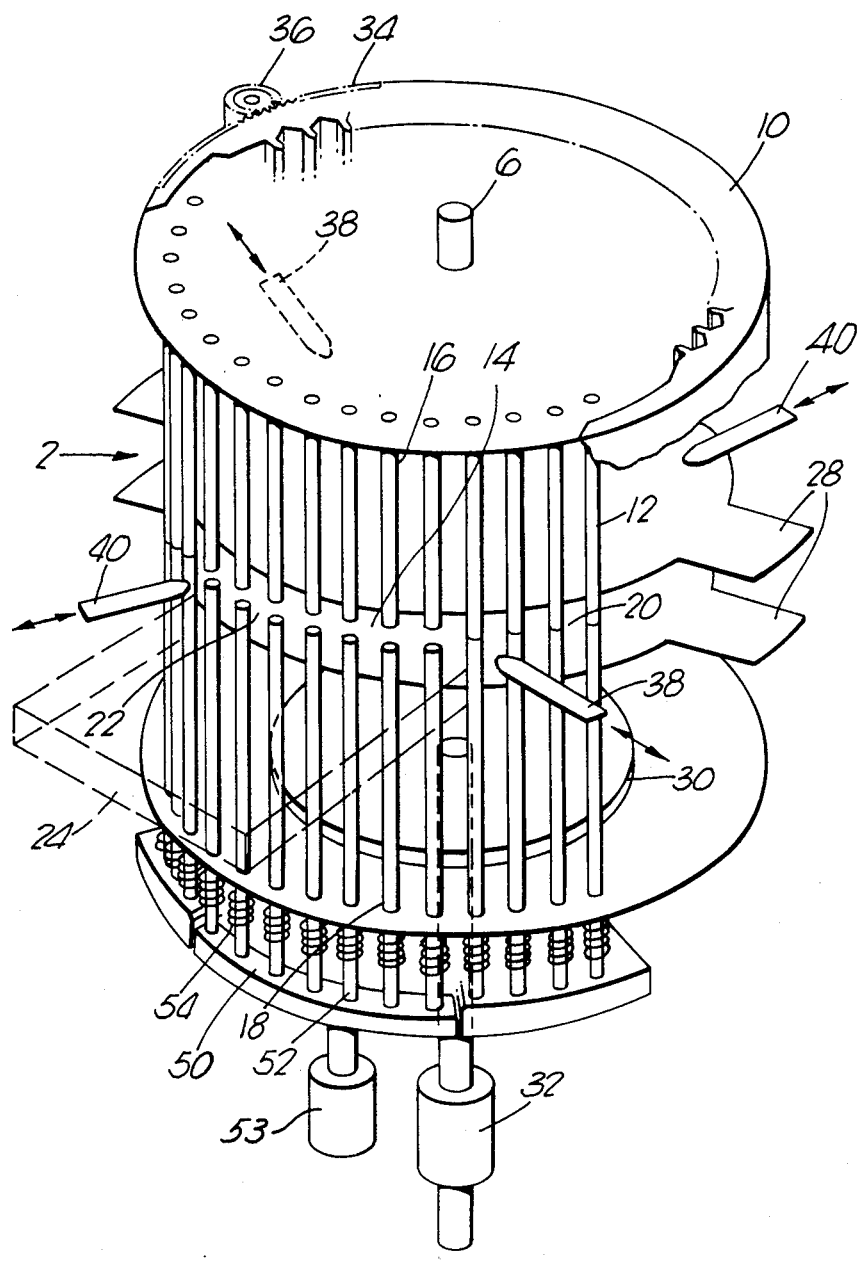

An embodiment of the invention will now be described with reference to the accompanying drawings in which:

FIG. 1 is a plan view of a cage for a retrieval device according to the invention, and FIG. 2 is a perspective view of the cage of FIG. 1.

The lamina retrieval device shown in the drawing is principally concerned with storing microfiche, holograms and the like and enabling these to be extracted or recalled easily from a microfiche information stack. The laminae may, however, be flat sheets recording data in a holographic or printed form or indeed any other suitable form. Furthermore the laminae need not be geometrically rectangular since slight modification of the guiding arrangements can accommodate laminae with tabs and even the present arrangements can accommodate laminae with indentations.

The stack is held in a case 2 shown in an opened out diagrammatic form in FIG. 2. The stack is divided up into subgroups of eight microfiche, one of such subgroups being shown at 4 in FIG. 1. The microfiche in this subgroup are fanned out about the central axis 6 of the cage so that each microfiche is angularly displaced from the next by about ten degrees. The microfiche are held in the fanned out condition by means of two sets of guides 10 and 12.

Guides 10 may be formed in a single component or else as pins or bars as shown in FIG. 2. The guides 12 are generally formed as pins which are split at 14 so that the top part 16 of the pins are static with relation to the cage and the lower part 18 which can reciprocate from a pin closed position shown at 20 and a pin open position shown at 22. The mechanism for opening the pins 22 is suitably by means of a cam track 50 acting on heads 52 of pins 22 which are biased by springs 54 into an open position as at 22. The guide pins 22 are opened when the pin heads 52 fall onto the cam track section 50. In order to close the guide pins 22, the lower cam track section 50 is made to act against the bias of the springs 54. The springs 54 are closed by suitable lift means 53. In another embodiment (not shown), the top part of the pins are movable with relation to the cage whilst the lower parts are static.

The purpose of splitting the pins 12, and not all of them need to be split at any one time, is that certain or a desired microfiche is required to be extracted from the stack through a duct 24 to a station shown diagramatically at 26. In one arrangement or system the station 26 is a copying station but equally this might be an editing station. Generally the pins 12 open out to a gap of 6 mm.

The subgroups of laminae are stacked together in the cage in groups of ten to form packs of 88 laminae. Each stack has eight groups of 88 laminae or 704 laminae altogether. If each lamina has, say, 488 images the magazine will hold 343,552 images.

Each group or pack of microfiche must be held separate from the next group by weight relieving plates 28 so that the weight on any one fiche in the stack never exceeds that of 87 fiche. The stack is arranged to be elevated by a ram plate 30 lifted by a screw or hydraulic means 32 so as to position a subgroup at the level of the pin opening. In this way the particular subgroup containing the desired microfiche has been selected and the cage which may be toothed as at 34 may be rotated by a pinion 36 to bring the desired microfiche, held in the guides 10 and 12 in a predetermined position, into alignment with the outlet duct 24. Whereupon fingers 38 and 40 respectively hold down the microfiche below the desired microfiche and hold up the microfiche above the desired microfiche. The desired microfiche is now in the stack opposite the duct 24 with the pins from F to L open.

In one embodiment the desired microfiche is at this stage blown out of the stack by means of air pressure source at 42 or a suction applied in duct 24. In a further embodiment (not shown) a gripping device may be inserted between pins 12 to grip the front edge 44 of the desired microfiche.

In a further embodiment instead of the ram plate 30 lifting the stack to bring a subgroup of microfiche opposite the opening position of pins 12, the whole cage 2 is lifted by similar means 32. The cage can also be completely removed from the retrieval device. In order to prevent the microfiche from falling out of the now opened cage, a semicylindrical cover indicated in broken lines at 48 is slid over the area of pins 12. This has the added advantage of preventing dust from entering the cage.

With some modification the device shown can also be constructed so that the cage axis is horizontal or preferably in an inclined orientation so that gravity may be used to help extract and insert laminae. In the case of inclined orientation the angle of inclination should be sufficient to overcome friction between adjacent laminae.

Whereas the embodiment of the present invention is primarily intended for extracting laminae such as microfiches or data cards from a stack, the invention has application in the retrieval of other kinds of laminae on which are recorded drawings or illustrations. It will, however, be understood that variations and modifications can be effected within the spirit and scope of the invention as described herein above and as defined in the appended claims.

I claim:

1. A lamina retrieval device arranged to hold a stack of laminae in a fanned out angularly displaced disposition with each lamina lying flat on the adjacent lamina of the stack comprising
   an axially elongate cage,
   said cage including a plurality of elongate parallel guides extending in axial direction of the cage, said guides forming retention means for the stack each guide acting to retain the stack in its fanned out disposition by interposing between adjacent corners of the laminae of the stack,
   at least some of said guides being movable to open said cage, and
   removal means for removing a desired lamina from said stack.

2. A device according to claim 1 in which said removal means comprises means for producing a gas from through said cage in a direction approximately at right angles to said guides.

3. A device according to claim 1 wherein said cage is mounted for movement about its axis whereby a desired lamina may be aligned with a feed position to a work station.

4. A device according to claim 1 wherein said cage is mounted for movement in direction parallel to its axis.

5. A device according to claim 1 wherein means are provided to interpose between said guides with said stack to hold the stack apart either side of a desired lamina.

6. A lamina retrieval device arranged to hold a stack of laminae in a fanned out angularly displaced disposition with each lamina lying flat on the adjacent lamina of the stack, comprising:
   a cage having an axis and formed from a plurality of elongate guides in at least two sets of guides,
   a first set of the guides being formed as elongate projections extending from an arcuate member of the cage towards the axis of the cage,
   a second said set of the guides being formed as elongate bars extending between top and bottom plates,
   said second set of the guides being formed in two divisable parts and mounted to the said plates so that one part may be moved relatively away from said other part to form a gap of a width sufficient to allow the exit of a said lamina from said cage,
   means for moving said sets relatively apart, and
   lamina removal means for extracting a desired lamina through said gap from said stack.

* * * * *